United States Patent [19]

Serafin

[11] Patent Number: 5,482,077
[45] Date of Patent: Jan. 9, 1996

[54] HIGH PRESSURE ABRASIVE SLURRY CHECK VALVE

[75] Inventor: Mark Serafin, Apple Valley, Minn.

[73] Assignee: Minnesota Mining and Manufacturing Company, St. Paul, Minn.

[21] Appl. No.: 339,027

[22] Filed: Nov. 14, 1994

[51] Int. Cl.⁶ .................................................. F16K 15/06
[52] U.S. Cl. ................... 137/516.25; 137/543.23
[58] Field of Search ...................... 137/516.25, 516.29, 137/543.23, 902

[56] References Cited

U.S. PATENT DOCUMENTS

| | | | |
|---|---|---|---|
| 3,051,196 | 8/1962 | Miller | 137/543.23 |
| 3,701,361 | 10/1972 | Bunn | 137/543.23 |
| 4,026,322 | 5/1977 | Thomas | 137/512 |
| 4,371,001 | 2/1983 | Olsen | 137/512.3 |
| 4,412,792 | 11/1983 | LaBorde et al. | 417/454 |
| 4,862,911 | 9/1989 | Yie | 137/454.4 |
| 4,908,154 | 3/1990 | Cook et al. | 252/314 |
| 5,110,463 | 5/1992 | Yuichi et al. | 210/194 |
| 5,241,986 | 9/1993 | Yie | 137/543.23 X |

*Primary Examiner*—Robert G. Nilson
*Attorney, Agent, or Firm*—Gary L. Griswold; Walter N. Kirn; Charles D. Levine

[57] ABSTRACT

A piston check valve for use in a system which conveys abrasive materials includes a gland nut which connects the valve to the piping system, a valve body mounted on the gland nut, a valve seat mounted on the valve body, and a piston mounted within the valve body. The piston can translate within the through bore of the valve seat and has a shaft and a head which contacts the first end of the valve seat when the valve is closed. A coil spring is located within the through bore of the valve seat and biases the valve closed. A first O-ring is mounted on the first end of the valve seat and is sufficiently wide to prevent sufficient quantities of chips from becoming lodged within the surface of the inner O-ring to form a hard bridge across the resilient O-ring, allowing erosion of the valve sealing surfaces. The first end of the valve seat has an O-ring groove which receives the O-ring. A second O-ring can be mounted on the first end of the valve seat at the outer periphery of the valve seat.

12 Claims, 2 Drawing Sheets

HIGH PRESSURE ABRASIVE SLURRY CHECK VALVE

TECHNICAL FIELD

The present invention relates to valves. More particularly, the present invention relates to check waives for use in abrasive slurry environments.

BACKGROUND OF THE INVENTION

Check valve designs that are arranged in the standard "T" configuration with the input and output positioned on opposing ends of the end block of the intensifier piston cylinder, are subjected to cyclic stress and fatigue resulting from the full range of applied stress that occurs during each intensifier piston stroke. With each piston stroke, the movable check valve piston hits the valve seat with considerable force, resulting in the deterioration of the common seating surfaces. In efforts to eliminate or reduce the incidence of valve failure, known valve designs have incorporated features such as easily repairable or easily replaceable valve pistons and valve seating surfaces, such as described in U.S. Pat. No. 4,371,001. Additionally, some known check valve designs reduce the degree of cyclic stress by arranging the valves coaxially, or by securing the valve assembly into the end of the intensifier cylinder as described in U.S. Pat. No. 4,026,322; U.S. Pat. No. 4,412,792; and U.S. Pat. No. 4,862,911. These check valves are designed for use with only pure water/polymer solutions.

A number of water jet pump systems are equipped with an absolute prefiltration process capable of removing particles smaller than 5 microns, which ensures that no large particles are encountered by the check valves. U.S. Pat. No. 4,908,154 discusses the need for incorporating two prefiltration steps to ensure that large particles do not contact the processing system.

Commercially available check valve designs are not always suitable for functioning in an abrasive slurry environment at operating pressures up to 2,873,000 N/m² (60,000 psi), at production-conducive throughput rates (greater than 0.5 gpm), because these valves are designed primarily for a water/polymer environment. The mode of failure of commercial valves is most commonly an erosion of the ball and corresponding seating surface, caused by the inability of the valve to seat securely, due to pigment particles becoming lodged between the ball-seat interface.

Valve seating designs incorporating a chamfer on the inside of the seat, with or without an elastomer O-ring, allow for faster build-up of particles between the ball-seat interface which results in an increase in the frequency of erosion failures. Elastomer O-rings, used in known valve designs to improve seating, fail due to the direct impingement by the abrasive stream, or due to the inability of the elastomer to withstand the solvent absorption/decompression, which occurs in a high pressure environment.

The onset of the erosion of the check valve seating surfaces could be slightly retarded by using hard ceramic materials, such as partially stabilized zirconia as part of the seating surface. However, this approach is not sufficiently erosion-resistant as the same type of erosion pattern that occurs on seats having softer metal material would eventually occur on the ceramic seat. The valve in U.S. Pat. No. 5,110,463 incorporates a hard ceramic seating surface.

SUMMARY OF THE INVENTION

This invention is a piston check valve designed to operate at pressures of up to 2,873,000 N/m² (60,000 psi), and function in an abrasive slurry environment, in which the particles of the slurries ranges from submicron sizes to sizes that may exceed that captured by a 60 mesh screen and at throughputs exceeding 1.5 gpm. This valve is operational for extended periods of time, more than 100 hours, and can function with slurries and dispersions that are heavily contaminated with metal and ceramic wear products.

The valve includes a valve body, and a valve seat mounted on the valve body. The valve seat has a first end, a second end, and a through bore. The valve seat is formed of a crenelated shape and with materials selected to withstand bombardment of the abrasive particles at high pressures and for long time periods. A piston translates within the through bore of the valve seat and has a head which contacts the first end of the valve seat when the valve is closed. An O-ring is mounted on the first end of the valve seat and has a width that is at least 50% of the diameter of the through bore.

The O-ring width can be between 60% and 70% of the diameter of the through bore with the diameter of the through bore ranging from 0.62 cm and 1.25 cm and the width of the O-ring ranging from 3.8 cm and 5.1 cm. Also, the first end of the valve seat can have an O-ring groove which receives the O-ring. A second O-ring can be placed in the first end of the valve seat in a peripheral O-ring groove.

The valve body can be mounted on a gland nut which connects the valve to a piping system. Also, a coil spring biases the valve closed.

DETAILED DESCRIPTION

Figure 1:
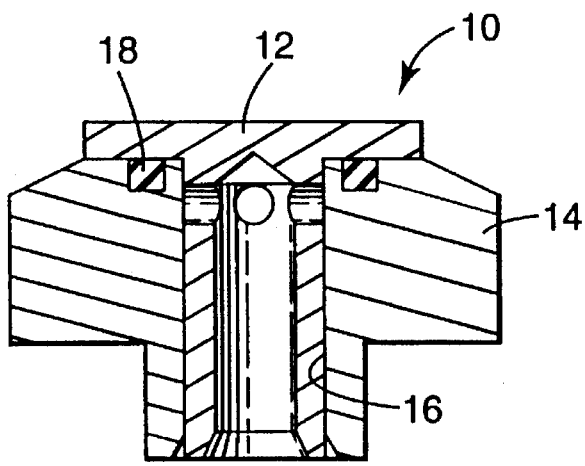
FIG. 1 is a cross-sectional view of a portion of a piston check valve of the present invention.

The inventors have discovered several piston check valve designs capable of operating continuously at pressures up to 2,873,000 N/m² (60,000 psi) for longer than 100 hours in production systems. These valves can be used with many different types of abrasive dispersions in addition to those involving magnetic pigments. As shown in FIG. 1, one embodiment of these valves 10 has the piston 12 overlap the axial inside of the chamfered valve seat 14, covering the entire through bore 16 in the valve seat and eliminating all critical seating interfaces which would be subjected to erosion by abrasive jets. The metal composition of the valve seat and piston can be a hard metal alloy, such as Teledyne Vasco Max #350, to reduce stress fractures that occur within the metal surfaces as a result of the repeated action of the piston onto the valve seat. Two plastic O-rings can be used, one O-ring 18 for sealing between the piston and the valve seat and the other for sealing between the valve seat and the valve body.

This check valve, while able to withstand abrasive slurries, would sometimes permit product leakage through the pressure relief ports of the housing body due to the significant stress fluctuations that exist on the input assembly. The stress fluctuations result in sufficient flexing of the valve body and gland nut to eventually reduce the contact between the valve seat and the valve body. The plastic outer seal of this valve was not designed to compensate for a loss of contact of this magnitude.

To correct this problem, the valve seat was redesigned by eliminating the chamfer on the valve seat and corresponding area of the valve housing and creating a crenelated shape. This increases the metal to metal contact area between the seat and the housing body. Subsequent modifications to sealing between the valve seat and the valve body include using a dissimilar metal, such as brass, as the outer, peripheral O-ring, and placing a notch in the face of the O-ring. The inner O-ring, located in the notched groove to further improve sealing capabilities, can be made from plastic, such as UHMW polyethylene.

With this valve, sometimes metal or ceramic chips, the wear products of steel sandmill media, would become lodged between the piston shaft and the valve seat. This impaired sealing at the inside of the valve seat prevented proper piston functioning. This was solved by doubling the minimum clearance between the piston shaft and the valve seat, from 0.0165 cm (0.0065 in) to 0.038 cm (0.015 in).

Also, processing pigmented dispersions that have quantities of metal or ceramic wear products, within the dispersion would sometimes impair sealing at the inside of the valve seat. These wear products are generated from both inherent sandmill media wear and internal wear products of the sandmill process. Impaired sealing occurred when non-extrudable metal or ceramic chips became lodged within the surface of the inner O-ring, forming a hard bridge across the resilient O-ring, and allowing erosion of the valve sealing surfaces. To correct this, the inner O-ring width (the difference between the inner and outer diameters of the O-ring) was increased 25%, from 0.125 cm to 0.16 cm (0.05 in to 0.063 in). This increase in O-ring width decreased the failure rate of the check valve. By further tripling the width of the O-ring, to a width of 0.475 cm (0.187 in), the seat becomes almost completely resistant to failure due to metal or ceramic chips being lodged into the sealing O-ring. This embodiment is shown in FIGS. 2–5.

Figure 3:
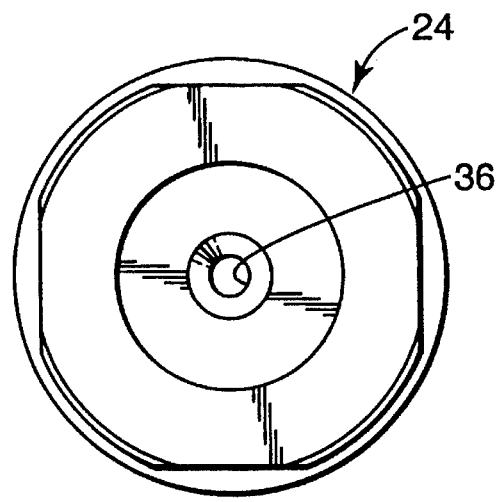
FIG. 3 is a top view of the valve of FIG. 2.
Figure 4:
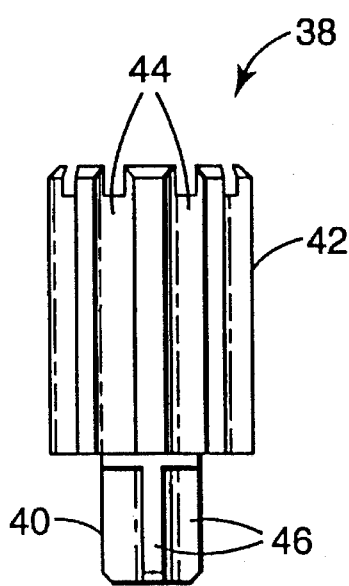
FIG. 4 is a side view of the piston of the valve of FIG. 2.
Figure 5:
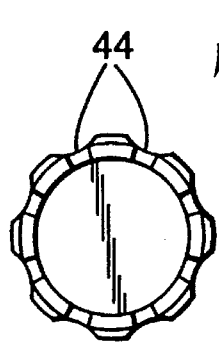
FIG. 5 is a top view of the piston of FIG. 4.
Figure 2:
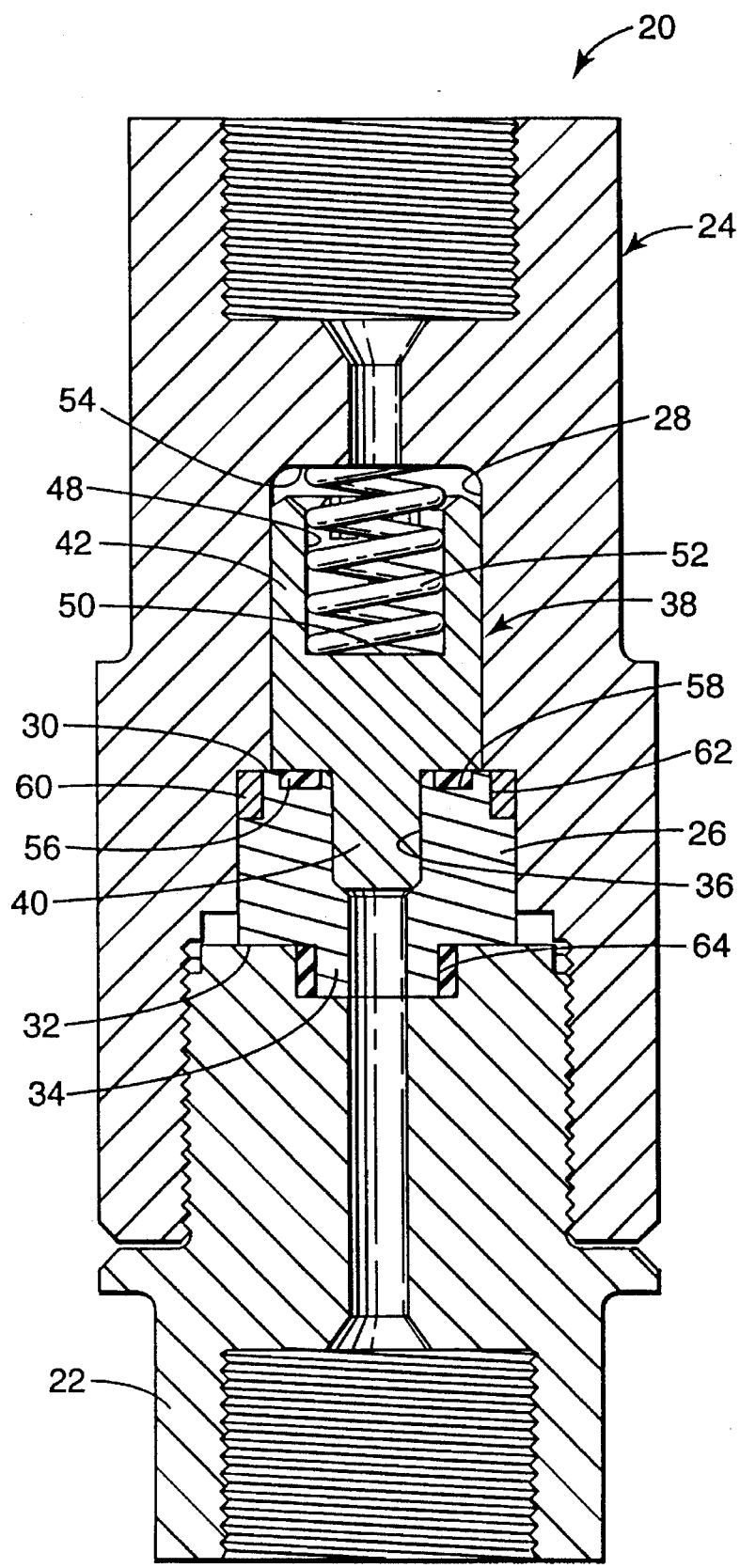
FIG. 2 is a cross-sectional view of a piston check valve of another embodiment of the present invention.

The valve 20 of FIGS. 2 and 3 includes a gland nut 22 which connects the valve to the piping system, a valve body 24 which is mounted on the gland nut 22, and a valve seat 26 which is mounted between the valve body 24 and the gland nut 22. The valve body 24 has a central cavity 28 which forms part of the fluid flow path through the valve 20. The valve seat 26 has a first end 30, an opposing second end 32 which includes a seat stem 34, and a through bore 36. The first end 30 can be crenelated. A poppet or piston 38 is mounted within the central cavity 28 in the valve body 24 and the through bore 36 of the valve seat 26. The piston 38 can translate within the central cavity 28 and through bore 36. The piston 38 has a shaft 40 located mostly in the through bore 36, and a head 42 located in the central cavity 28. The piston head 42 contacts the first end 30 of the valve seat 26 when the valve 20 is closed. The piston head 42 has flutes 44 and the piston shaft 40 has four legs 46, as best shown in FIGS. 4 and 5, to permit flow past the piston 38 when the valve 20 is open. More or fewer flutes and legs can be used. The piston head 42 is open at the top surface, forming an open cylinder 48 with one end 50. A coil spring 52 is located within the central cavity 28 of the valve body 24 and fits within the open cylinder 48 of the piston head 42. The coil spring 52 pushes against the end wall 54 of the central cavity 28 and the end 50 of the open cylinder 48 of the piston head 42.

An inner O-ring 56 is mounted on the first end 30 of the valve seat 26 and is sufficiently wide to prevent sufficient quantities of metal or ceramic chips from becoming lodged within the surface of the inner O-ring 56 to form a hard bridge across this resilient O-ring, allowing erosion of the valve sealing surfaces. It has been found that an O-ring 56 width of about at least 50% of the diameter of the through bore 36 is sufficiently wide. In the illustrated embodiment, the through bore diameter is 0.714 cm (0.281 in) and the O-ring is 0.0475 cm (0.187 in) wide. This O-ring width is 66% of the through bore diameter. Preferably, the first end 30 of the valve seat 26 has an O-ring groove 58 which receives the O-ring 56.

An outer, peripheral O-ring 60 can be mounted in the valve body 24 at the outer periphery of the first end 30 of the valve seat 26. This O-ring 60 can be received by an O-ring groove 62 formed in the outer periphery of the valve seat 26. A seat stem O-ring 64 can be mounted around the valve seat stem 34 at the second end 32 of the valve seat 26. This O-ring 64 seals between the valve seat 26 and the gland nut 22.

I claim:

1. A piston check valve, for use in a system which conveys abrasive materials in which the particles range from submicron sizes to sizes that may exceed that captured by a 60 mesh screen and at throughputs exceeding 1.5 gpm, and capable of operating at pressures of up to 2,873,000 N/m$^2$ and for time periods exceeding 100 hours, comprising:

a valve body having a central cavity which forms part of the fluid flow path through the valve;

a valve seat mounted on the valve body and having a first end, a second end, and a through bore, wherein the first end of the valve seat is formed of a crenelated shape and with materials selected to withstand bombardment of abrasive particles ranging from submicron sizes to sizes is that may exceed that captured by a 60 mesh screen and at throughputs exceeding 1.5 gpm, and to be capable of operating at pressures of up to 2,873,000 N/m$^2$ and for time periods exceeding 100 hours;

a piston translatable within the central cavity in the valve body and the through bore of the valve seat which contacts the first end of the valve seat when the valve is closed;

means for biasing closed the valve;

an O-ring mounted on the first end of the valve seat wherein the width of the O-ring is at least 50% of the diameter of the through bore.

2. The valve of claim 1 wherein the width of the O-ring is between 60% and 70% of the diameter of the through bore.

3. The valve of claim 1 wherein the diameter of the through bore ranges from 0.62 cm to 1.25 cm and the width of the O-ring ranges from 3.8 cm to 5.1 cm.

4. The valve of claim 1 wherein the first end of the valve seat has an O-ring groove which receives the O-ring.

5. The valve of claim 1 further comprising a second O-ring, wherein the first end of the valve seat has a peripheral O-ring groove which receives the second O-ring.

6. The valve of claim 1 further comprising a gland nut which connects the valve to a piping system, wherein the valve body is mounted on the gland nut and the valve seat is mounted between the valve body and the gland nut.

7. The valve of claim 1 wherein the piston has a shaft located mostly in the through bore and a head located in the central cavity and wherein the biasing means comprises a coil spring located within the central cavity of the valve body.

8. The valve of claim 7 wherein the central cavity has an end wall, wherein the piston head is fluted and the piston shaft has legs to permit flow past the piston when the valve is open, wherein the piston head is open at the top surface to form an open cylinder with one end, and wherein the coil spring fits within the open cylinder of the piston head and pushes against the end wall of the central cavity and the end of the open cylinder of the piston head.

9. A piston check valve, for use in a system which conveys abrasive materials in which the particles range from submicron sizes to sizes that may exceed that captured by a 60 mesh screen and at throughputs exceeding 1.5 gpm, and capable of operating at pressures of up to 2,873,000 N/m$^2$ and for time periods exceeding 100 hours, comprising:

a gland nut which connects the valve to a piping system;

a valve body mounted on the gland nut and having a central cavity which forms part of the fluid flow path through the valve;

a valve seat mounted between the valve body and the gland nut and having a first end, a second end which includes a seat stem, a through bore, and an O-ring groove in the first end, wherein the first end of the valve seat is formed of a crenelated shape and with materials selected to withstand bombardment of abrasive particles ranging from submicron sizes to sizes that may exceed that captured by a 60 mesh screen and at throughputs exceeding 1.5 gpm, and to enable the valve to operate at pressures of up to 2,873,000 N/m$^2$ and for time periods exceeding 100 hours;

a piston translatable within the central cavity in the valve body and the through bore of the valve seat and having a shaft located mostly in the through bore, and a head located in the central cavity which contacts the first end of the valve seat when the valve is closed;

a coil spring located within the central cavity of the valve body which biases closed the valve;

a first O-ring mounted in the O-ring groove in the first end of the valve seat wherein the width of the O-ring is at least 50% of the diameter of the through bore; and a second O-ring mounted in the peripheral O-ring groove in the first end of the valve seat.

10. The valve of claim 9 wherein the width of the O-ring is between 60% and 70% of the diameter of the through bore.

11. The valve of claim 9 wherein the diameter of the through bore ranges from 0.62 cm to 1.25 cm and the width of the O-ring ranges from 3.8 cm to 5.1 cm.

12. The valve of claim 9 wherein the central cavity has an end wall, wherein the piston head is fluted and the piston shaft has legs to permit flow past the piston when the valve is open, wherein the piston head is open at the top surface to form an open cylinder with only one end, and wherein the ceil spring fits within the open cylinder of the piston head and pushes against the end wall of the central cavity and the end of the open cylinder of the piston head.

* * * * *